April 30, 1957 P. R. GRAHAM 2,790,470
MORTISING AND BORING MACHINE
Filed Jan. 14, 1953 2 Sheets-Sheet 1
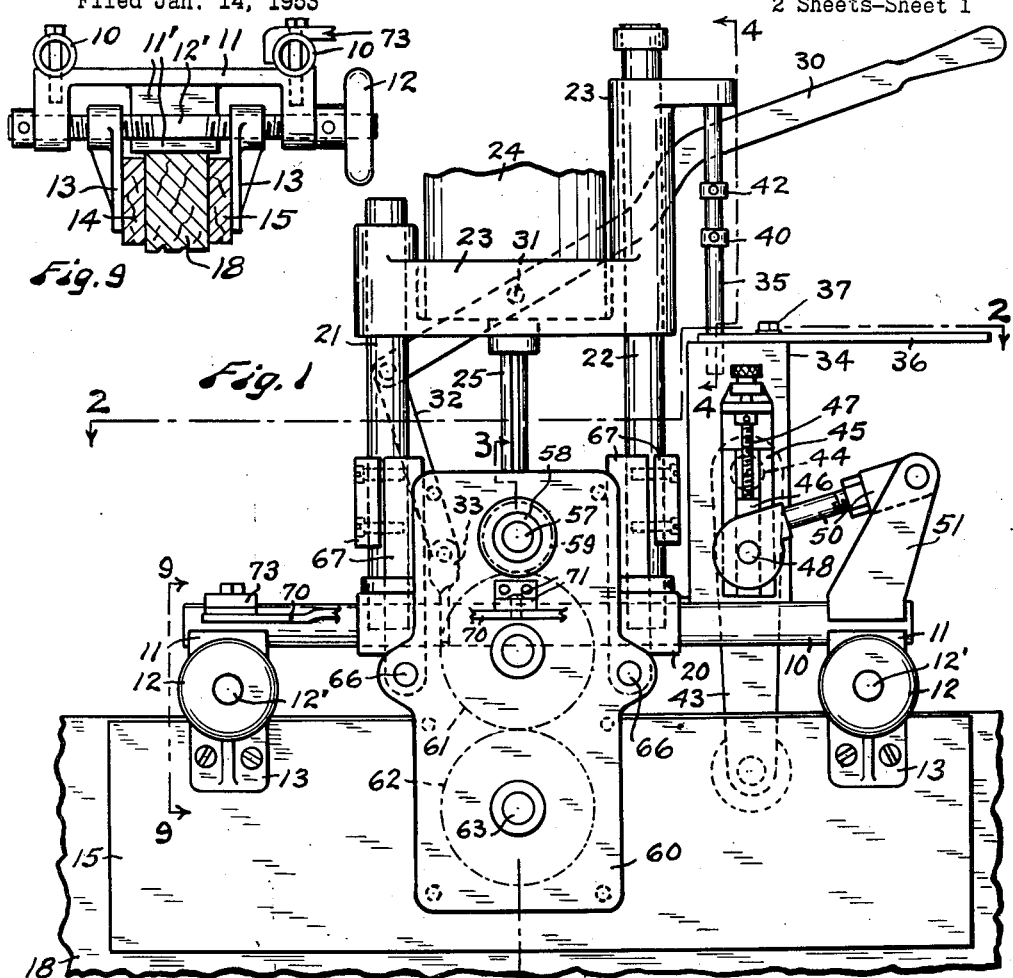
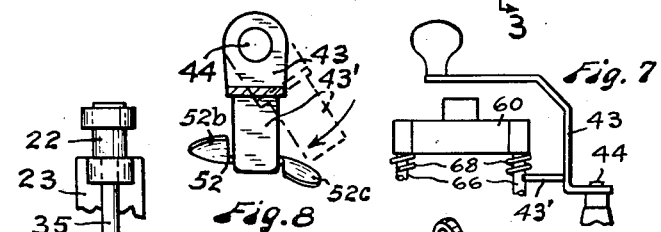
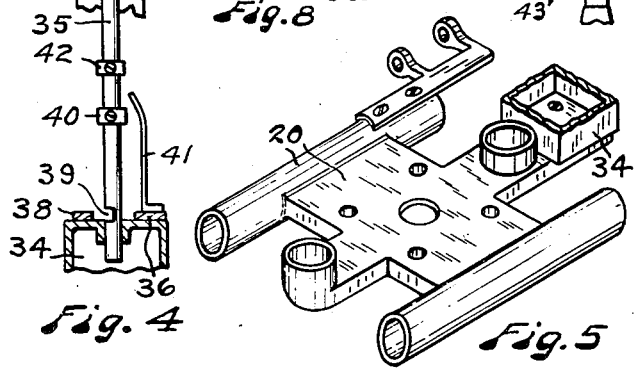
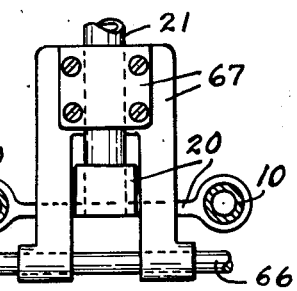
INVENTOR
Percy R. Graham
Fred C. Matheny
ATTORNEY April 30, 1957     P. R. GRAHAM     2,790,470
MORTISING AND BORING MACHINE
Filed Jan. 14, 1953     2 Sheets-Sheet 2

INVENTOR
Percy R. Graham
BY
Fred C. Matheny
ATTORNEY

United States Patent Office 2,790,470
Patented Apr. 30, 1957

2,790,470
MORTISING AND BORING MACHINE
Percy R. Graham, Seattle, Wash.
Application January 14, 1953, Serial No. 331,267
9 Claims. (Cl. 144—3)

This invention relates to a mortising and boring machine and this machine is particularly well adapted for use on doors to make the necessary mortises and bores to receive tubular locks but it will be understood that the machine may be used for other purposes.

An object of this invention is to provide a mortising and boring machine which is capable of speedily and accurately providing in the edge portion of a door a mortise for receiving a face plate and a bore for receiving a tubular lock bolt, the diameter of the bore being the same as the width of the mortise and the machine being capable of successfully performing the mortising and boring in one substantially continuous operation without changing the tool.

Another object of this invention is to provide a machine of this nature which will make a mortise to receive a lock face plate and a hole to receive a lock bolt and another hole to receive a knob spindle of a lock in rapid succession and with one application of the machine to the door and without changing boring or mortising tools.

Another object of the invention is to provide a door mortising and boring machine in which boring tools for boring a knob spindle hole transversely of the door are driven from a rotatable tool shaft which is positioned in the medial plane of the door and carries a tool for boring a bolt receiving hole and making a face plate receiving mortise in the edge of the door.

A further object of the invention is to provide a door mortising and boring machine having means for successively applying axially aligned boring tools to opposite sides of a door to quickly and easily and accurately bore a knob shank receiving hole in the door without danger of splintering the surface of the door.

Other objects of this invention will be apparent from the following description taken in connection with the accompanying drawings.

In the drawings Figure 1 is a side elevation, with parts broken away of a mortising and boring machine constructed in accordance with this invention, showing the same applied to a door.

Fig. 4 is a detached fragmentary view partly in elevation and partly in section substantially on a broken line 4—4 of Fig. 1, showing a stop rod and devices which cooperate therewith to limit downward movement of a tool.

Fig. 5 is a detached isometric view, with parts broken away, showing a carriage used in connection with this invention.

Fig. 6 is a fragmentary view with parts in section and parts omitted, looking in the direction of broken line 6—6 of Fig. 2.

Fig. 7 is a detached plan view, on a reduced scale, showing crank means by which a carriage is reciprocably moved, parts of the machine being broken away.

Fig. 8 is a fragmentary view partly in section and partly in elevation showing a self latching means for holding a crank in a fixed position.

Fig. 9 is a fragmentary end view, with parts in section, taken substantially on broken line 9—9 of Fig. 1, and showing one form of door clamping mechanism which may be used in connection with this invention, parts being omitted.

Like reference numerals designate like parts throughout the several views.

Figure 3:
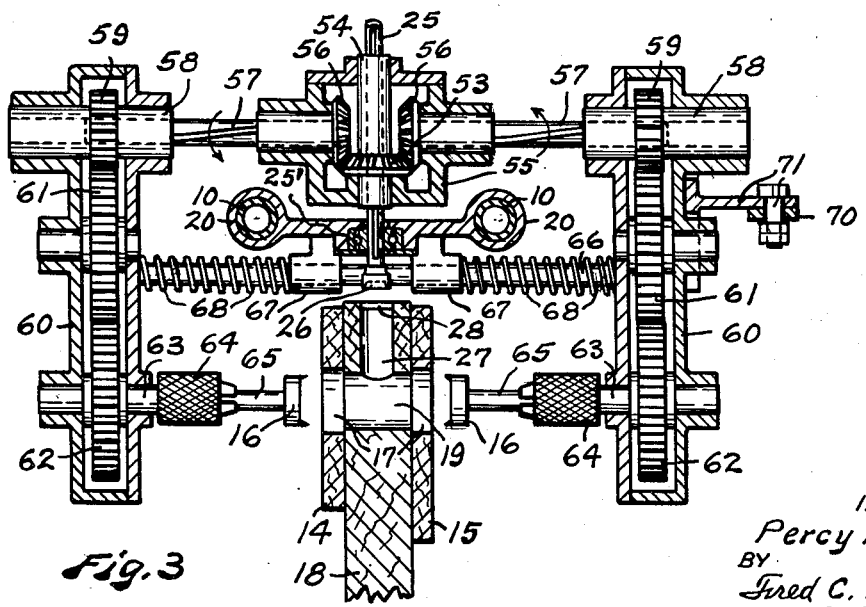
Fig. 3 is a view partly in section and partly in elevation taken substantially on broken line 3—3 of Fig. 1, parts being omitted.

The machine comprises two spaced apart parallel track bars 10 rigidly connected with each other by cross bars 11 positioned adjacent the ends of the track bars 10. Each cross bar 11, see Fig. 9 has a positioning member 11' which is adapted to rest on the edge of a door. Also each cross member 11 carries door clamping means, which may be of the form shown in Fig. 9, and which includes a shaft 12' having a turn knob 12 and having oppositely pitched threads whereon clamp brackets 13 are mounted. Door engaging plates 14 and 15 preferably of hard wood, such as oak, are secured to the clamp brackets 13. Side boring tools 16, Fig. 3, operate through holes 17 in plates 14 and 15 to bore a knob spindle hole 19 transversely in a door 18. If desired the holes 17 in the plates 14 and 15 may be in the form of longitudinal slots in said plates and the side boring tools do not need to be retracted as far as shown in Fig. 3 but may be shielded in these slots 17 when they are in fully retracted positions relative to the door 18. Preferably the plate 15 is wider than the plate 14 and extends below the plate 14. When a user holds the machine with the plate 15 nearest his body, preparatory to applying the machine to a door, the wider plate 15 may be used as a bumper or stop to engage with the door and thus make it easier for the user to properly position the machine on a door. Ordinarily the door edge to which the machine is applied will be in a horizontal position.

A carriage 20 is movable lengthwise on the track bars 10 and carries parallel perpendicular posts 21 and 22. A motor supporting frame 23 is vertically movable on the posts 21 and 22 and carries a motor 24 having a splined shaft 25 disposed perpendicularly of the carriage and extending toward and through the carriage. Preferably a ball or roller bearing 25' is provided in the carriage 10 to cooperate in supporting the shaft 25. A bit 26 of a type commonly termed a bottom router bit is attached to the lower end of the shaft 25. The bit 26 is suitable for both boring and routing purposes. This bit 26 is used to bore a hole 27 and route out a face plate mortise opening 28 in the edge portion of the door 18. The hole 27 is adapted to receive the bolt portion of a tubular lock.

The motor frame 23 and motor 24 are adapted to be moved toward and away from the carriage 20 by a lever 30 which is connected by a pivot 31 with the motor frame 23 and by a link 32 with a bracket 33 that is attached to the carriage 20.

Stop and latch means used to control movement of the motor frame 23 and motor 24 relative to the carriage 20 are as follows: An upright rectangular frame bracket 34 is rigidly secured to the carriage 20 adjacent the post 22. A stop rod 35 is rigid with the motor frame 23 and is guided for vertical movement in the frame bracket 34. A forked lever 36 is mounted by a pivot member 37 on the top of bracket 34 and has an arm 38 adapted to engage within a notch 39 to hold the motor frame and parts carried thereby in a raised and inoperative position. A stop collar 40 on the stop rod 35 is adapted to contact the top of the bracket 34 in its downward movement to limit movement of the bit 26 in boring a lock bolt receiving hole 27 in a door. A resilient arm 41 is secured to and protrudes from the lever 36 alongside of the rod 35. This resilient arm 41 may be positioned, by movement of the lever 36, so that it will be engaged by an upper collar 42 on said rod 35 to limit movement of the frame 23 and tool shaft 25 and bit 26 toward the door 18 in making the face plate mortise 28. The diameter of the bolt receiving hole 27 is the same as the width of the face plate mortise 28. This makes the hole 27 slightly oversize and it is easier to fit and install a tubular lock if this hole is oversize. The lever 36 has three positions, namely the locked position shown in Fig. 2, an unlocked position shown in Fig. 4, which permits boring of the bolt receiving hole 27, the arm part 38 being clear of the notch 39 and the spring pawl 41 being clear of the upper collar 42 in this position, and a third face plate mortising position in which the spring arm 41 is in stopping or blocking position beneath the upper collar 42.

Figure 2:
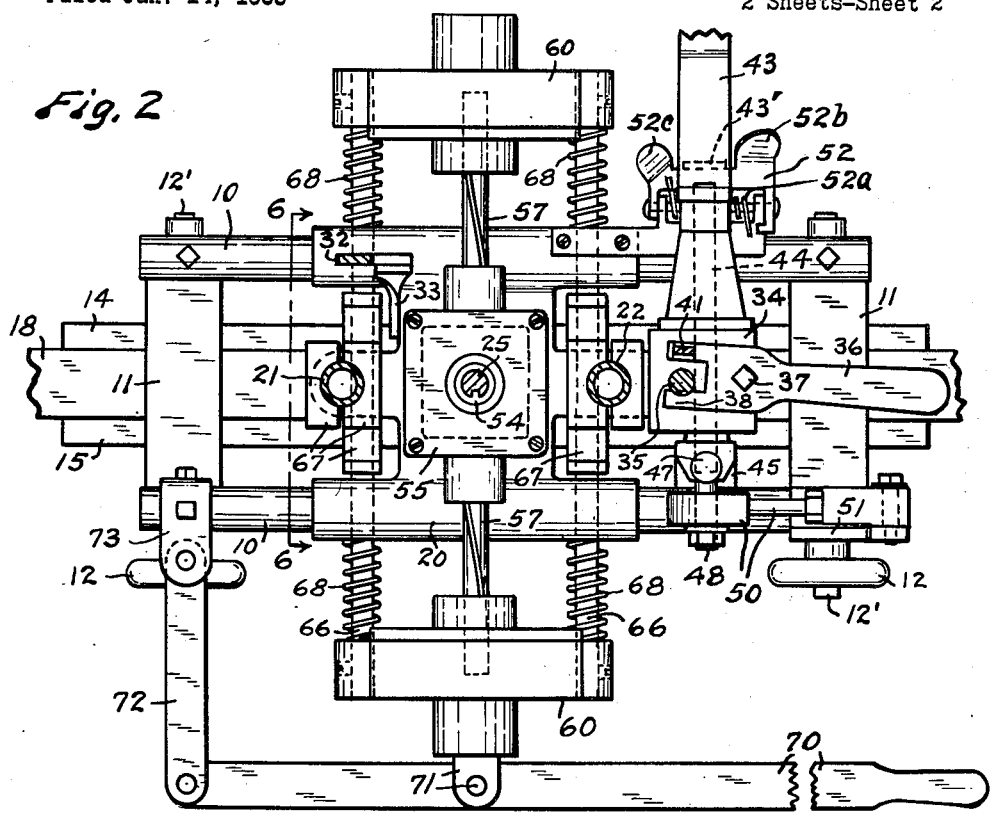
Fig. 2 is a view partly in plan and partly in section of the same taken substantially on broken line 2—2 of Fig. 1.

The means for moving the carriage 20 and parts carried thereby lengthwise of the track bars 10 to make the face plate receiving mortise 28 is as follows: A crank arm 43 is rigid with a shaft 44 which is journaled in the housing or frame bracket 34. Another arm 45 is rigidly mounted on the shaft 44 and carries a longitudinally adjustable slide block 46 which is adjustable by a screw 47. A crank pin 48 on the slide block 46 is connected by connecting rod means 50 with a rigid frame bracket 51. The bracket 51 is attached to one of the track rods 10. Releasable latch means 52, Figs. 2 and 8, is provided to engage with a member 43' on the crank arm 43 and lock said crank arm in a downwardly extending position. This latch means is readily releasable manually and is adapted to automatically stop and lock the crank arm at the end of one complete revolution each time the crank arm is released and rotatively moved. The latch member 52 is urged upwardly by a spring 52a and can be moved downwardly by pressure of a finger on a part 52b thereof to release the crank 43. The member 43' on crank 43, when moved in the direction shown by the arrow in Fig. 8, will engage with a downwardly curved part 52c of member 52 when it is in a position as shown by dot and dash lines and will automatically depress said latch member as it moves toward the full line position in which it will be stopped and locked at the end of the revolution. The crank arm 43 extends outwardly far enough to clear the adjacent gear housing 60, as illustrated in Fig. 7. When the crank arm 43 is latched in the downwardly extending position the bottom router tool 26 will be properly positioned for boring the bolt receiving hole 27 and the carriage will be held immovable during this boring operation.

The machine hereinbefore described is a complete and operative mortising and boring machine capable of being used for making the face plate mortise 28 and lock bolt receiving opening 27 with the one tool 26 at one continuous operation. However, to complete the boring of a door to receive a tubular lock, of a form well known to the trade, it is desirable to provide means for transversely boring the knob spindle receiving hole 19 in the door.

The means herein disclosed for boring the knob spindle hole 19 is driven from the splined shaft 25 and comprises two duplicate knob spindle boring units positioned in spaced apart relation so that they operate from opposite sides of the door. As the parts of these two knob spindle boring units are of duplicate construction they are similarly numbered in the accompanying drawings and the following description applies equally well to each of these units. The provision of duplicate side boring units provides for successively boring inwardly first from one side and then from the opposite side of the door to complete the opening 19 by forming two aligned intersecting openings and this avoids the surface splitting which almost always occurs if a wood boring tool is allowed to go entirely through a piece of wood.

Both knob spindle boring units are constantly driven from a bevel gear 53 having a rigid sleeve 54 which is splined on the tool shaft 25 and is mounted in a housing 55. Each knob spindle boring unit comprises a bevel gear 56 meshing with the bevel gear 53 and having a rigidly attached spirally splined countershaft 57 which extends transversely away from the tool shaft 25 and through the splined hub 58 of a small spur gear or gearwheel 59 in a housing 60. The spiral splining on each countershaft 57 is in the proper direction so that when driving torque is applied by the motor 24 to the countershaft, due to contact of the tool 16 of that unit with the door, it will tend to move the side boring unit by which the boring is being done toward the door 18. This makes for ease of operation in boring the knob spindle hole 19. Each gearwheel 59 meshes with an idler gearwheel 61, which in turn, drives a third gearwheel 62 which is secured to a tool shaft 63. Each gearwheel 61 and tool shaft 63 is journaled in one of the housings 60. A chuck 64 on each tool shaft 63 receives the shank 65 of the adjacent side boring tool 16.

The two housings 60 are rigidly secured to and connected with each other by two parallel spaced apart cross bars or rods 66 which are slidably supported in brackets 67. The brackets 67 extend below the carriage 20 and are adjustably attached to the carriage 20 as by clamping them to the respective posts 21 and 22. The brackets 67 may be adjusted up and down a limited amount on posts 21 and 22 to vary the distance of the knob spindle holes 19 from the edge of the door. The adjustment afforded by the brackets 67 is small in extent but is sufficient to take care of the required variations in distance of knob spindle holes 19 from the edges of doors. The housing 55 is left free from and clear of the carriage 20 to allow for this adjustment.

Spring means, such as compression springs 68 on the rods 66 is preferably provided to urge the side boring units into the inoperative position in which they are shown in Figs. 2 and 3.

The means for successively applying the side boring units to a door 18 to bore the transverse knob spindle hole 19 in the door comprises a lever 70 connected by pivot and bracket means 71 with one of the housings 60 and further connected by a link 72 with a bracket 73 which is rigidly secured to one of the track members 10.

In using this machine a complete mortising job may be very quickly and easily done by one application of the machine to a door and the order in which the mortise 28 and holes 27 and 19 are made may be varied. Usually this work is carried out by first setting the lever 36 so that the spring arm 41, shown in Figs. 2 and 4, is under the stop collar 42 and stops the bottom router bit 26 at the proper depth for making the shallow mortise 28. The tool is lowered by the lever 30 and is horizontally moved through the correct cycle for making the face plate mortise 28 by imparting one complete revolution to the crank 43. This moves the tool 26 back and forth throughout the complete length of the mortise 28 and stops the tool 26 at the proper location for boring the hole 27 for the lock bolt. This hole 27 may be bored by moving the spring arm 41 to a released position, as shown in Fig. 4, depressing lever 30 until it is stopped by engagement of the collar 40 with the top end of the housing 34, and then raising the lever 30. The transverse knob shank receiving hole 19 may be quickly and easily bored without danger of splintering the door by using the lever 70 to apply first one side boring tool 16 and then the other to the door.

The carriage 20 is guided for straight line movement on the rods 10. The tool shaft 25 is longitudinally movable and is positioned so that it is perpendicular to the direction of movement of the carriage 20 and so that its axis is in a plane coincident with the medial plane of the door when the machine is applied to a door. The other tool shafts 63, which carry the side boring tools 16, are axially aligned for boring two holes which register and intersect and which combine to form the hole 19, and said other tool shafts 63 are positioned perpendicularly to the axis of the tool shaft 25 and on opposite sides of the axis of said shaft 25 and with their common axis intersecting the projected axis of the tool shaft 25.

The door clamping means always accurately positions the boring and mortising machine centrally of the door and the mortise 28 and holes 27 and 19 are always accurately formed and accurately positioned relative to each other to receive locks of standard size and shape.

The foregoing description and accompanying drawings clearly disclose a preferred embodiment of this invention but it will be understood that this disclosure is merely illustrative and that changes may be made within the scope and spirit of the following claims.

I claim:

1. A combined mortising and boring machine for mortising and boring a door to receive a lock comprising a frame; means operable to support said frame on an edge portion of a door; a carriage guided by said frame for movement in a straight line along the edge of the door; a longitudinally movable rotatively driven mortising and boring tool positioned with its axis perpendicular to the edge of the door and coincident with the medial plane of the door; tool feeding means operable to longitudinally move said tool, whereby the tool is applied to the door; stop means predetermining the amount of longitudinal movement of the tool toward the door; carriage moving means providing straight line transverse reciprocable cycles of mortising movement of the carriage; and releasable carriage holding devices securing said carriage in a predetermined boring position mid way of the length of the reciprocable cycle of movement of the carriage, whereby a mortise recess and a bored hole transversely centered relative to the mortise recess and positioned intermediate the length of the recess and of a diameter equal to the width of the recess may be successively formed with said tool in the edge portion of the door.

2. A combined mortising and boring machine comprising two parallel spaced apart track bars; work engaging means carried by said track bars positioned to support said track bars on a work piece parallel to the edge of the work piece; a carriage movable longitudinally of said track bars; a rotatively driven tool carried by said carriage and positioned with its axis mid way between the two track bars and perpendicular to the common plane of the track bars; means operable to impart longitudinal feeding movement to said tool relative to said work piece; carriage moving means operable to reciprocably move said carriage in a straight line on said track bars and thereby impart cycles of reciprocating mortising travel to said tool; stop means predetermining the longitudinal positioning of said tool; and releasable means operable to lock said carriage in a fixed position on said track bars mid way of the length of the reciprocable cycle of movement of the carriage, whereby longitudinal feeding of the tool will bore the work piece.

3. A combined mortising and boring machine comprising a carriage guided for movement in a straight line; a motor; means on said carriage supporting said motor for movement toward and away from the carriage in a direction perpendicular to the direction of movement of the carriage; a plurality of spaced apart stop members carried by said motor supporting means; selective stop member engaging means carried by the carriage and located adjacent the stop members and movable to predetermined positions into and out of the path of movement of the stop members for engagement by said stop members in stopping the movement of said motor at different distances from said carriage; a driven tool shaft carried by said motor and positioned with its axis at right angles to the direction of movement of the carriage; a boring and mortising tool on said tool shaft; motor and tool moving means operable to move said motor and tool toward and away from said carriage; carriage moving means providing reciprocable cycles of transverse movement of said carriage in a straight line; and releasable means operable to lock said carriage in a fixed position on said track bars mid way of the length of the reciprocable cycle of movement of the carriage, whereby a mortise recess and a bored hole centered relative thereto may be successively made with said tool.

4. In a combined mortising and boring machine for mortising and boring a door to receive a lock, a frame; means operable to support said frame on an edge portion of a door; a carriage movable on said frame in a straight line along the edge of the door; a longitudinally movable rotatively driven tool shaft carried by said carriage and positioned with its axis perpendicular to the edge of a door and coincident with the medial plane of the door; a mortising and boring tool on said shaft, whereby mortises and bores may be provided in the edge of the door; two rigidly connected tool shaft mounting devices movably supported by the carriage at opposite sides of the first named tool shaft for movement transversely of said first named tool shaft; two other tool shafts rotatively supported by the respective mounting devices in spaced apart axial alignment relative to each other and with their common axis perpendicular to and intersecting the axis of the first named tool shaft; a tool axially aligned with and carried by each of said other tool shafts, said tools being directed toward each other and positioned on opposite sides of the door; control means connected with said mounting devices providing simultaneous movement of each mounting device and the tool shaft thereon in the same direction as the other mounting device and tool shaft thereon in selectively applying a tool on either of said other tool shafts to the door; and a train of driving gears connecting each of said other tool shafts with said first named tool shaft.

5. A boring machine comprising a longitudinally movable driven tool shaft; a reciprocable carriage supporting said tool shaft; a tool on said tool shaft; two other coaxial longitudinally movable longitudinally spaced apart tool shafts disposed at right angles to the axis of said first named tool shaft and on opposite sides of the axis of said first named tool shaft with their common axis intersecting the axis of said first named tool shaft; a tool on each of said other tool shafts; two rigidly connected tool shaft mounting devices movably supported by the carriage at opposite sides of said first named tool shaft for movement transversely of said first named tool shaft and rotatively supporting said two other tool shafts; control means connected with said mounting devices providing simultaneous movement of each mounting device and the tool shaft thereon in the same direction as the other mounting device and tool shaft thereon in selectively moving a tool on either of said other tool shafts toward the axis of said first named tool shaft; and a train of gears connecting each of said other tool shafts with said first named tool shaft, whereby said other tool shafts are driven from said first named tool shaft.

6. A boring and mortising machine comprising a frame, a carriage guided for straight line movement by said frame; a longitudinally movable rotatively driven tool shaft provided with a tool and carried by said carriage and extending through the carriage and positioned perpendicularly to the direction of movement of the carriage; means operable to longitudinally move said tool shaft; two countershafts perpendicular to said tool shaft and extending in opposite directions therefrom; driving means connecting said countershafts with said tool shaft; two housings receiving the outer end portions of the respective countershafts; two other coaxial tool shafts having tools thereon and carried by the respective gear housings and positioned parallel to and spaced from the countershafts and perpendicular to and on opposite sides of the axis of the first named tool shaft with their common axis intersecting the axis of said first named tool shaft; gearwheels connecting said other tool shafts with the respective countershafts, whereby said other tool shafts are driven from said first named tool shaft; cross bars slidably supported by said carriage and rigidly connecting said two gear housings; and means operable to simultaneously move said two housings, whereby said two other tool shafts are simultaneously moved in the same direction to selectively apply a tool on either of said other tool shafts to work.

7. The apparatus as claimed in claim 6 in which bevel gears are provided to connect the two countershafts to the first named tool shaft and in which one of said bevel gears is splined on said first named tool shaft.

8. The apparatus as claimed in claim 6 in which each countershaft is spirally splined and extends slidably through a spirally splined mating hub of a gearwheel in one of the housings and in which the pitch of the spiral spline means is arranged so that it will tend to feed a tool on one of the said other tool shafts into work to which said tool is applied.

9. The apparatus as claimed in claim 6 in which resilient means is provided between the housings and the carriage yieldingly urging said housings into an inoperative position in which the tools carried by said housings are clear of work.

References Cited in the file of this patent

UNITED STATES PATENTS

| | | |
|---|---|---|
| 580,273 | Grier | Apr. 6, 1897 |
| 583,806 | Kelly | June 1, 1897 |
| 1,394,766 | Smith | Oct. 25, 1921 |
| 1,633,370 | Hunter | June 21, 1927 |
| 1,718,324 | Wappat | June 25, 1929 |
| 1,738,227 | Carter | Dec. 3, 1929 |
| 1,761,663 | Gray | June 3, 1930 |
| 1,865,576 | Luginbuhl | July 5, 1932 |
| 2,314,697 | Goff | Mar. 23, 1943 |